United States Patent [19]

Santo

[11] Patent Number: 4,619,800

[45] Date of Patent: Oct. 28, 1986

[54] METHOD OF MAKING A DECORATIVE COMPOSITE PANEL

[76] Inventor: Phillip J. Santo, 12 Mountain Rd., Rochester, N.Y. 14625

[21] Appl. No.: 723,145

[22] Filed: Apr. 15, 1985

[51] Int. Cl.[4] .............................................. B32B 31/04

[52] U.S. Cl. .................................... 264/139; 144/332; 144/360; 156/211; 156/229; 156/257; 156/268; 264/152; 264/292; 264/DIG. 66

[58] Field of Search ............... 264/139, DIG. 66, 292, 264/112, 118, 152; 156/229, 257, 268, 211; 144/330, 331, 332, 359, 360

[56] References Cited

U.S. PATENT DOCUMENTS 3,943,022 3/1976 Susnjara .......................... 156/257 X

*Primary Examiner*—Donald Czaja
*Assistant Examiner*—Leo B. Tentoni
*Attorney, Agent, or Firm*—Lawrence P. Kessler

[57] ABSTRACT

Decorative panels having the appearance of tongue-in-groove construction and the method of making such panels. The panels are made from a composite structure including a base member and a decorative surface veneer on such member. A portion of the base member is removed. The removed portion includes a segment to a first depth less than the total depth of the base member measured from the surface of the base member opposite the veneer, and spaced segments to a total depth of the base member. This leaves an intermediate part of the base member connected to the veneer between the removed spaced segments. The sides of the base member opposite the removed portion are urged toward one another; and the intermediate part is substantially simultaneously urged toward the surface of the base member opposite the veneer. The intermediate part is then secured to such sides of the base member to complete the panel.

6 Claims, 8 Drawing Figures

METHOD OF MAKING A DECORATIVE COMPOSITE PANEL

BACKGROUND OF THE INVENTION

This invention relates generally to decorative panels, and more particularly to a decorative composite panel having the appearance of tongue-in-groove construction and the method of making same.

In certain furniture or wall covering applications wood panels are used for decorative purposes. Such panels are typically of two types of construction. The first type of construction employs individual solid wood boards which are interconnected by tongue-in-groove joints. Panels constructed in this way are very expensive due to the cost of the boards and the labor and equipment required to form the tongue-in-groove joints. As such, these panels are only used in the highest quality, and accordingly most expensive, furniture or wall coverings. The second type of construction attempts to emulate the first type construction at a reduced cost, both as to material and labor. Such second type of panel construction employs a large sheet of composition wood material covered on one surface with a decorative veneer embossed to give the appearance of solid wood. To make the panel look like it is formed of individual boards interconnected by tongue-in-groove joints, strips of the veneer are removed and the underlying material stained an appropriate matching color. While panels constructed in this manner have found wide acceptance in both furniture and wall coverings, their use has been limited to economy applications because, upon cursory examination, their construction is apparent and has never fully met the appearance of panels of the first described type of construction.

SUMMARY OF THE INVENTION

This invention is directed to decorative panels having the appearance of tongue-in-groove construction and the method of making such panels. The panels are made from a composite structure including a base member and a decorative surface veneer on such member. A portion of the base member is removed. The removed portion includes a segment to a first depth less than the total depth of the base member measured from the surface of the base member opposite the veneer, and spaced segments to a total depth of the base member. This leaves an intermediate part of the base member connected to the veneer between the removed spaced segments. The sides of the base member opposite the removed portion are urged toward one another; and the intermediate part is substantially simultaneously urged toward the surface of the base member opposite the veneer. The intermediate part is then secured to such sides of the base member to complete the panel.

The invention, and its objects and advantages, will become more apparent in the detailed description of the preferred embodiment presented below.

BRIEF DESCRIPTION OF THE DRAWINGS

In the detailed description of the preferred embodiment of the invention presented below, reference is made to the accompanying drawings, in which.

DESCRIPTION OF THE PREFERRED EMBODIMENT

Figure 1:
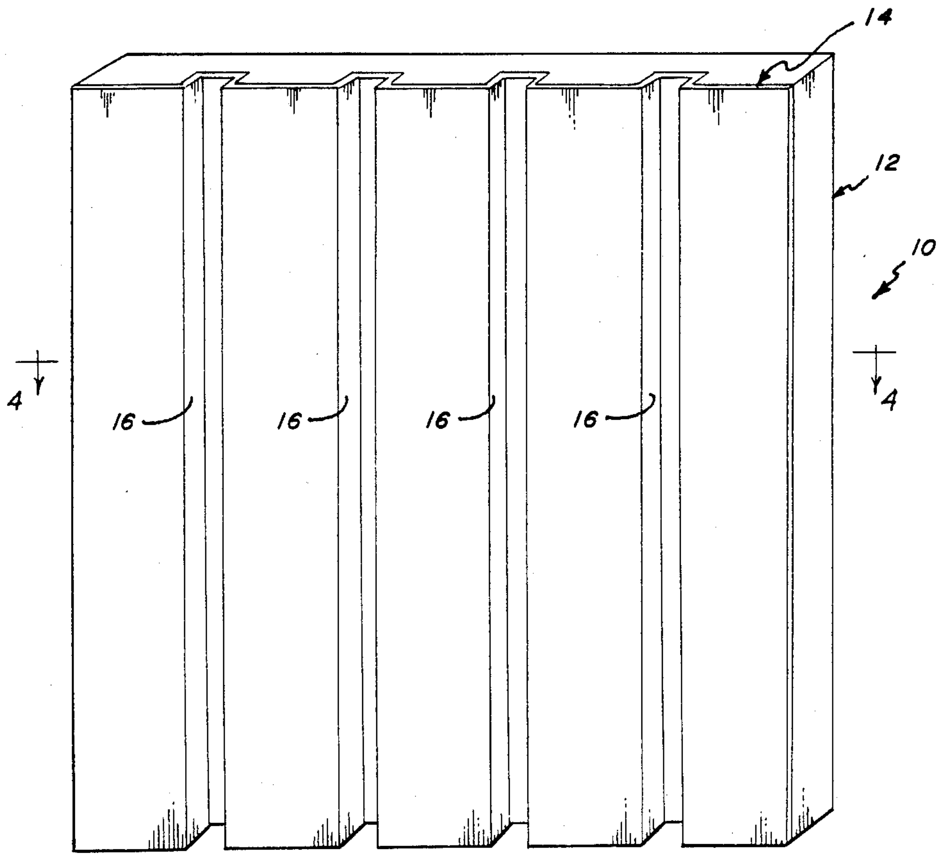
FIG. 1 is view, in perspective, of a decorative panel having the appearance of tongue-in-groove construction according to this invention.
Figure 2:
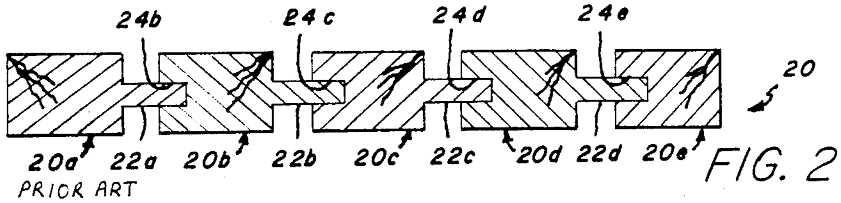
FIG. 2 is a cross-sectional view of a decorative panel of tongue-in-groove construction as found in the prior art.
Figure 3:
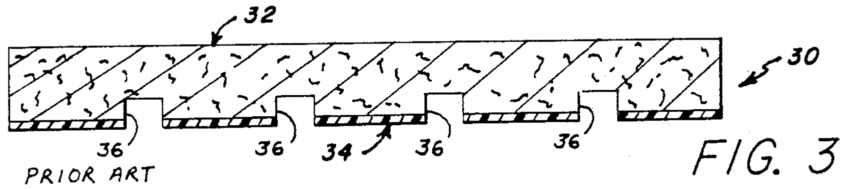
FIG. 3 is a cross-sectional view of a decorative panel as found in the prior art, attempting to emulate the appearance of tongue-in-groove construction.
Figure 4:
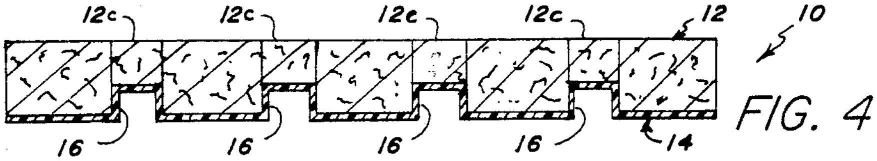
FIG. 4 is a cross-sectional view, taken on lines 4—4 of FIG. 1, of a decorative panel, according to this invention, having the appearance of tongue-in-groove construction.

Referring now to the accompanying drawings, a decorative panel, according to this invention, is designated generally in FIGS. 1 and 4 by the numeral 10. The panel 10 is intended to give the appearance of a high quality, tongue-in-groove constructed panel, such as panel 20 shown in FIG. 2. The prior art panel 20 comprises individual boards **20*a*–20*e* of solid wood respectively having opposing longitudinal marginal edges shaped as tongues 22*a*–22*d* and grooves 24*b*–24*e*. Such boards are joined by the interconnection of the tongue of one board with the groove of an adjacent board. FIG. 3 shows a prior art decorative panel 30 which attempts to emulate the appearance of tongue-in-groove construction. Such panel has a base member 32 covered with a decorative surface veneer 34 embossed to give the appearance of solid wood. Parallel longitudinal grooves 36 are cut into the base member through the surface veneer 34. While the grooves 36 are stained to match the veneer, the overall appearance obviously fails, on even a cursory inspection, to give the look of the high quality panel 20 of FIG. 2**.

The panel 10 is composite structure including a base member 12 and a surface veneer 14. The base member 12 is, for example, composition board material; and the surface veneer is, for example, vinyl material embossed to give the appearance of high quality solid wood. Of course, other materials are suitable for use in the decorative panel of this invention. Substantially parallel longitudinal grooves 16 are formed in the panel 10 in the manner to be explained hereinbelow. Because the embossed surface veneer 14 covers the entire surface of the grooves 16, the panel 10 gives the appearance of high quality tongue-in-groove construction.

Figure 5:
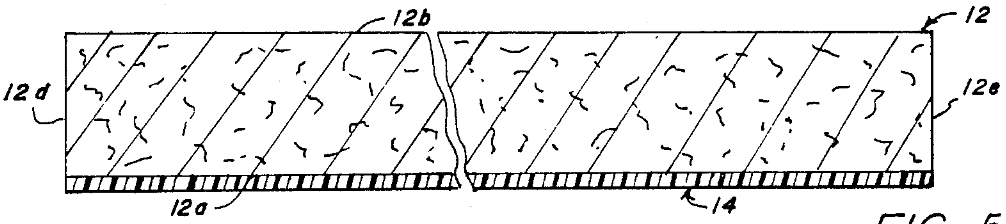
FIGS. 5 through 8 are cross-sectional views, in sequence and on an enlarged scale, showing the formation of the decorative panel, according to this invention.
Figure 6:
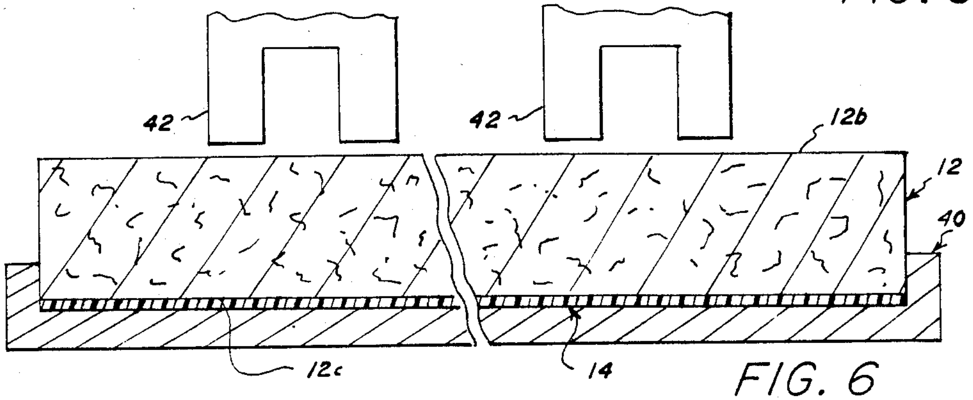
Figure 7:
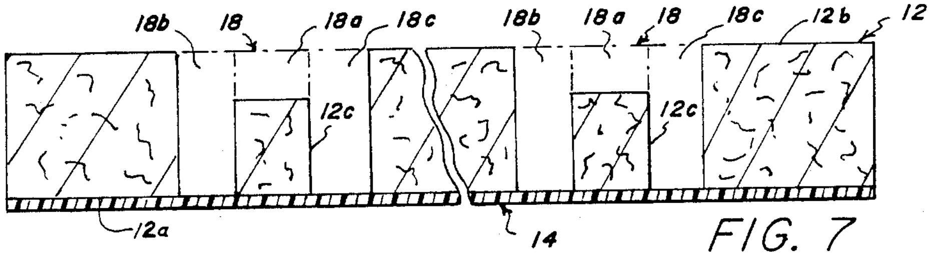

The method of making the decorative panel 10, according to this invention, is described with particular reference to FIGS. 5 through 8. As shown in FIG. 5, the panel 10 starts out in flat form with the veneer 14 secured to a surface **12*a* of the base member 12. Such composite structure is mounted in a fixture 40 which aligns the structure with a plurality of spaced cutting heads 42 (corresponding to the desired number of grooves to be formed) adjacent to surface 12*b* of the base member 12 (See FIG. 6). The structure is then moved past the cutting heads, and the heads engage the structure to respectively remove longitudinal portions 18 from the base member 12 (see FIG. 7**).

The portions 18 respectively include a first segment **18*a* and second segments 18*b*, 18*c* bounding the first segment. The first segment extends into the base member 12, measured from surface 12*b*, to a depth less than the distance between surface 12*b* and 12*a*. The width and depth of segment 18*a* are selected to correspond to the desired width and depth of the finished groove 16. While such width and depth depend on the overall appearance desired for the panel, it has been found that a depth of approximately 25%-50% of the distance between surfaces 12***b* and 12*a* yields an optically pleasing result for the finished groove. The second segments (18*b*, 18*c*) extend into the base member 12, measured from the surface 12*b*, to the full depth between surfaces 12*b* and 12*a*. Since the second segments bound the first segment, an intermediate part 12*c*, secured to the veneer 14, is left after the portion 18 is fully removed (see FIG. 7). For the reasons set forth below, the width of the second segments is substantially equal to the desired depth of the finished groove 16.

Figure 8:
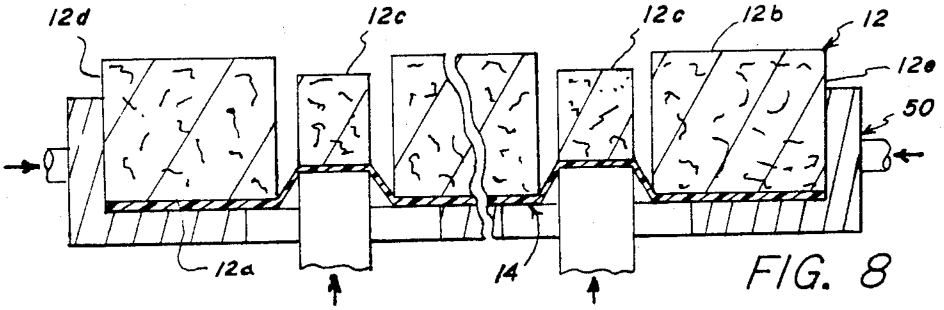

Once the portions 18 are removed, the composite structure is mounted in a fixture 50 (see FIG. 8). In such fixture, marginal edges 12*d* and 12*e* of the base member are urged toward one another. Substantially simultaneously, parts 12*c* are urged toward surface 12*b*. Such urging action continues until, for each portion 18, the segments 18*b*, 18*c*, are closed (i.e., base member and intermediate part are in intimate contact) and part 12*c* forms a contiguous planar surface with surface 12*b* (see FIG. 4). Since the widths of segments 18*b*, 18*c* are respectively substantially equal to the desired depth of the groove 16, when such segments are closed, the veneer opposite such segments is located so as to line the side walls of the groove. Thus, the surfaces of the grooves 16, over their entire surface area, are covered with the decorative surface veneer 14. After, the parts 12*c* are located relative to the base member 12 in the above-described manner, such parts are permanently secured to the adjacent portions of base member by any suitable means, such as stapling or gluing, for example, to complete the decorative panel 10. Alternatively prior to the urging action, a suitable glue may be placed in the segments 18*b*, 18*c* so that when the urging action is completed and the glue sets, parts 12*c* are secured to the adjacent portions of the base member. The completed decorative panel 10 then has the high quality look of tongue-in-groove construction, primarily because the grooves 16 are completely covered with the decorative embossed surface veneer 14.

While the grooves 16 have been shown and described as having a generally rectangular cross-sectional shape, any other suitable shape may also be formed according to this invention. For example, the cross-sectional shape of the grooves may be of a modified V configuration where the grooves have sloping side walls. To form a groove with sloping side walls, the parts 12*c* are held in a particular spaced relation from adjacent portions of the base member as the glue sets. That is, the fixture 50 urges the edges 12*d*, 12*e* toward one another to a degree which does not completely close the segments 18*b*, 18*c*, and the part 12*c* is urged toward the surface 12*b* but is not contiguous therewith. Accordingly, the surface veneer between the portion covering parts 12*c* and the portions covering adjacent base member portions have an inward slope of a degree determined by the location of parts 12*c* and the held spaced relation. The glue, when set, supports such sloped veneer to maintain the modified V groove shape.

The invention has been described in detail with particular reference to preferred embodiment thereof, but it will be understood that variations and modifications can be effected within the spirit and scope of the invention.

I claim:

1. A method for making a decorative panel having the appearance of tongue-in-groove construction, from a composite structure including a bass member and a decorative surface veneer on such member, said method comprising the steps of:

removing a portion of said base member, such portion including a segment of said base member to a first depth less than the total depth of said base member measured from the surface of said base member opposite to said veneer, and spaced segments of said base member to a total depth of said base member, leaving an intermediate part of said base member connected to said veneer between such spaced segments;

substantially simultaniously urging the sides of such base member opposite the removed portion toward one another and said intermediates part toward the surface of said base member opposite the veneer until the remaining portions of said base member and said intermediate part are in mutual contact and lie in a plane; and permanently securing the intermediate part to such sides of said base member.

2. The method of claim 1 wherein in the step of removing the portion of said base member, removal to the first depth is at least 25% of the total depth.

3. The method of claim 1 wherein, prior to the step of urging the side of the base member toward one another, an adhesive is applied to the portions of the veneer adjacent to the intermediate part, whereby such veneer portions are secured to the respective side walls of said base member during such urging step.

4. A method for making a decorative panel, giving the appearance of tongue-in-groove construction, from a composite structure including an elongated base member having a first and second surface bounded by marginal side walls, and a decorative surface veneer secured to said second surface and extending between such marginal side walls, said method comprising the steps of:

removing portion of the base member, such portion located intermediate such marginal side walls substantially parallel thereto and extending into the base member, measured from the first surface, a distance less than the distance between the first and second surfaces;

removing additional portions of the base member adjacent to the first removed portion, such additional portions being substantially parallel to the marginal side walls and extending into the base member from the first surface to the second surface thereby leaving an intermediate part of the base member between such additionally removed portions;

substantially simultaneously urging the marginal side walls toward one another and the intermediate part of the base member toward the first surface until the remaining portions of the base member contact the intermediate part and the surface of the intermediate part opposite the secured veneer is substantially coextensive with the first surface of the base member in the plane thereof; and permanently securing the remaining portions of the base member to the intermediate part.

5. The method of claim 4 wherein the removing steps are carried out substantially simultaneously.

6. The method of claim 4 wherein in the removing steps a plurality of spaced parallel portions and respectively associated additional portions are removed.

* * * * *